United States Patent
Xu

(10) Patent No.: US 9,346,377 B2
(45) Date of Patent: May 24, 2016

(54) HEIGHT ADJUSTMENT MECHANISM FOR HEAD REST OF CHILD SAFETY SEAT

(71) Applicant: MAX-INF (NINGBO) BABY PRODUCT CO., LTD., Ningbo, Zhejiang (CN)

(72) Inventor: Lihong Xu, Ningbo (CN)

(73) Assignee: MAX-INF(NINGBO)BABY PRODUCT CO., LTD., Ningbo (CN)

( * ) Notice: Subject to any disclaimer, the term of this patent is extended or adjusted under 35 U.S.C. 154(b) by 211 days.

(21) Appl. No.: 14/109,981

(22) Filed: Dec. 18, 2013

(65) Prior Publication Data

US 2014/0203604 A1 Jul. 24, 2014

(30) Foreign Application Priority Data

Jan. 19, 2013 (CN) .................... 2013 2 0027448 U

(51) Int. Cl.
*B60N 2/28* (2006.01)
*B60N 2/02* (2006.01)

(52) U.S. Cl.
CPC .. *B60N 2/28* (2013.01); *B60N 2/02* (2013.01); *B60N 2/2851* (2013.01)

(58) Field of Classification Search
CPC ........... B60N 2/28; B60N 2/02; B60N 2/2851
USPC ..................................................... 297/250.1
See application file for complete search history.

(56) References Cited

U.S. PATENT DOCUMENTS

| | | | | |
|---|---|---|---|---|
| 4,854,639 A * | 8/1989 | Burleigh | ............... | B60N 2/2803 297/250.1 |
| 6,030,047 A * | 2/2000 | Kain | .................... | B60N 2/2812 297/250.1 |
| 6,135,553 A * | 10/2000 | Lovie | ................... | B60N 2/2821 297/250.1 |
| 6,273,509 B1 * | 8/2001 | Reithmeier | .............. | B60N 2/28 297/391 |
| 6,378,950 B1 * | 4/2002 | Takamizu | ............ | B60N 2/0284 297/250.1 |
| 6,491,348 B1 * | 12/2002 | Kain | .................... | B60N 2/2812 297/250.1 |
| 6,779,843 B2 * | 8/2004 | Kain | .................... | B60N 2/2812 297/250.1 |
| 7,032,969 B1 * | 4/2006 | Campbell | ............ | B60N 2/2851 297/256.1 |
| 7,055,903 B2 * | 6/2006 | Balensiefer | .......... | B60N 2/2821 297/250.1 |
| 7,066,536 B2 * | 6/2006 | Williams | ............. | B60N 2/2851 16/266 |
| 7,246,854 B2 * | 7/2007 | Dingman | ............. | B60N 2/2806 297/250.1 |

(Continued)

*Primary Examiner* — David R Dunn
*Assistant Examiner* — Tania Abraham

(57) ABSTRACT

A child safety seat is provided with a backrest including parallel first and second recesses; a head rest including first and second projections slidable in the first and second recesses respectively, and top first and second holes; an adjustment plate including side slots; a pressing plate on bottom ends of the first and second recesses; first and second trigger rods between the backrest and the head rest wherein the first trigger rod includes a bottom tab member moveable in one slot, and a top finger tab; the second trigger rod includes a bottom tab member moveable in the other opposite slot, and a top finger tab; and the finger tab of the first trigger rod projects out of the first hole and the finger tab of the second trigger rod projects out of the second hole; and a biasing member.

4 Claims, 6 Drawing Sheets

(56) References Cited

U.S. PATENT DOCUMENTS

| | | | | |
|---|---|---|---|---|
| 8,109,571 B2* | 2/2012 | Chen | B60N 2/2821 | 297/250.1 |
| 8,272,690 B2* | 9/2012 | Brandl | B60N 2/2851 | 297/250.1 |
| 8,622,476 B2* | 1/2014 | Karremans | B60N 2/2812 | 297/250.1 |
| 2009/0212613 A1* | 8/2009 | Freeman | B60N 2/2851 | 297/250.1 |
| 2010/0102604 A1* | 4/2010 | Barnes | B60N 2/2821 | 297/250.1 |
| 2011/0133532 A1* | 6/2011 | Zhao | B60N 2/2812 | 297/250.1 |
| 2011/0309663 A1* | 12/2011 | Brunick | B60N 2/2851 | 297/250.1 |
| 2012/0153690 A1* | 6/2012 | Gaudreau, Jr. | B60N 2/2821 | 297/250.1 |
| 2012/0223558 A1* | 9/2012 | Wang | B60N 2/2821 | 297/250.1 |
| 2014/0049081 A1* | 2/2014 | Davis | B60N 2/26 | 297/256.11 |

* cited by examiner

HEIGHT ADJUSTMENT MECHANISM FOR HEAD REST OF CHILD SAFETY SEAT

BACKGROUND OF THE INVENTION

1. Field of the Invention

The invention relates to child safety seats and more particularly to a child safety seat having a height adjustment mechanism for its head rest.

2. Description of Related Art

A child safety seat is designed for the safety of a child seated on a passenger car. Typically, a head rest is provided on a top of a commercially available child safety seat for the purposes of safety, comfort, and protecting a child from injury or death during collisions.

For accommodating children of different heights and adjusting head rest height, China Utility Model No. CN201086654Y published on Jul. 17, 2007 entitled "Height adjustment mechanism for head rest of a child safety seat" discloses a height adjustment mechanism for chair head rest. Its characteristics are that a recess is provided in a support plate, locking slots are biased by a spring, locking blocks are provided, and a locking blocks seat is secured to a back rest so that locking and unlocking of the head rest can be effected. However, its adjustment operation is inconvenient, its structural components are complicated, precision requirements of the recess and the locking slots are relatively high, and its manufacturing is not convenient. Thus, the need for improvement still exists.

SUMMARY OF THE INVENTION

It is therefore one object of the invention to provide a child safety seat having a structurally simple and conveniently operated height adjustment mechanism for its head rest.

For solving problems associated with the prior art, the invention is provided with a child safety seat comprising a back rest including parallel first and second recesses, longitudinally on a back; a head rest including rearward projecting first and second projections, configured to slide in the first and second recesses, respectively, a first hole on a top edge, and a second hole on the top edge; an elongated adjustment plate mounted on the back of the back rest and including a plurality of slots on both sides respectively; a pressing plate disposed on bottom ends of the first and second recesses; first and second trigger rods, disposed between the back rest and the head rest wherein the first trigger rod includes a tab member at a bottom end moveably disposed in one of the slots on one side of the adjustment plate, and a finger tab at a top end; the second trigger rod includes a tab member at a bottom end moveably disposed in one of the slots on an other side of the adjustment plate, and a finger tab on a top end; and the finger tab of the first trigger rod projects out of the first hole and the finger tab of the second trigger rod projects out of the second hole; and a biasing member disposed between the tab member of the first trigger rod and the tab member of the second trigger rod wherein the biasing member acts to dispose the tab member of the first trigger rod in one of the slots on one side of the adjustment plate, and dispose the tab member of the second trigger rod in one of the slots on an other side of the adjustment plate.

Preferably, further comprising a cover plate disposed on the back rest with the first and second trigger rods, disposed between the cover plate and the back rest, a transverse rib disposed on the back rest, and two longitudinal grooves disposed on the back rest and crossing the rib; and wherein the first and second trigger rods, are disposed in the grooves respectively.

Preferably, the adjustment plate further includes two mounting plates on top and bottom ends respectively, the mounting plates being threadedly secured to the back of the back rest.

Preferably, the first projection includes a shroud of rectangular section having four curved corners, and the second projection includes a shroud of rectangular section having four curved corners.

The invention has the following advantages in comparison with the prior art:

It has a simple construction. A turning of the first and second finger tabs can unlock the head rest so as to effect a height adjustment of the head rest in a convenient way. The height adjustment mechanism is provided on the back of the head rest so that after a child being seated, an adult may use one hand to do the height adjustment. Finally, the head rest is secured without the worry of vibration after finishing the height adjustment.

The above and other objects, features and advantages of the invention will become apparent from the following detailed description taken with the accompanying drawings.

DETAILED DESCRIPTION OF THE INVENTION

Figure 1:
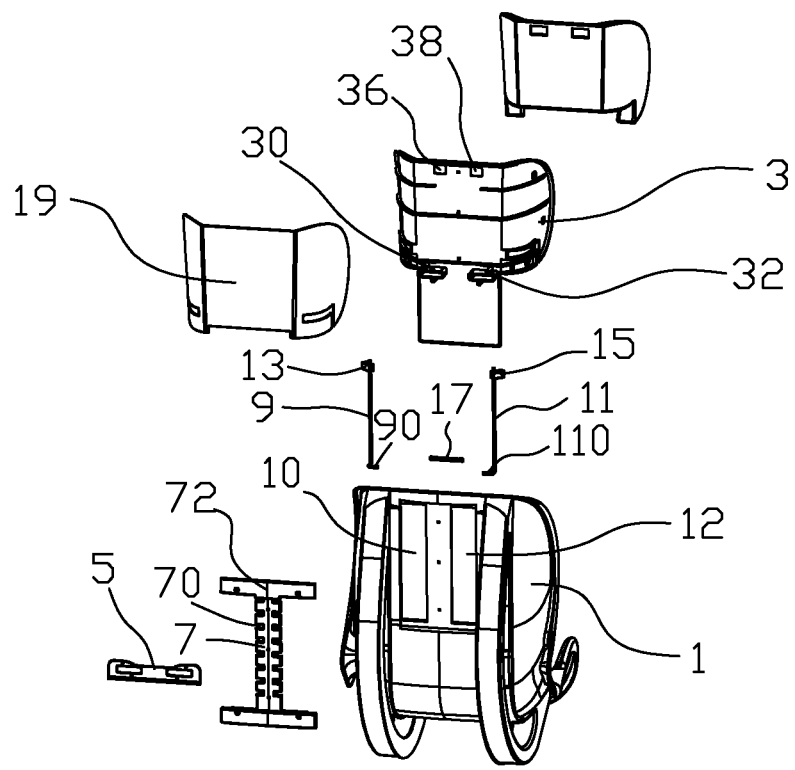
FIG. 1 is an exploded view of a child safety seat having a height adjustment mechanism for its head rest according to the invention.
Figure 2:
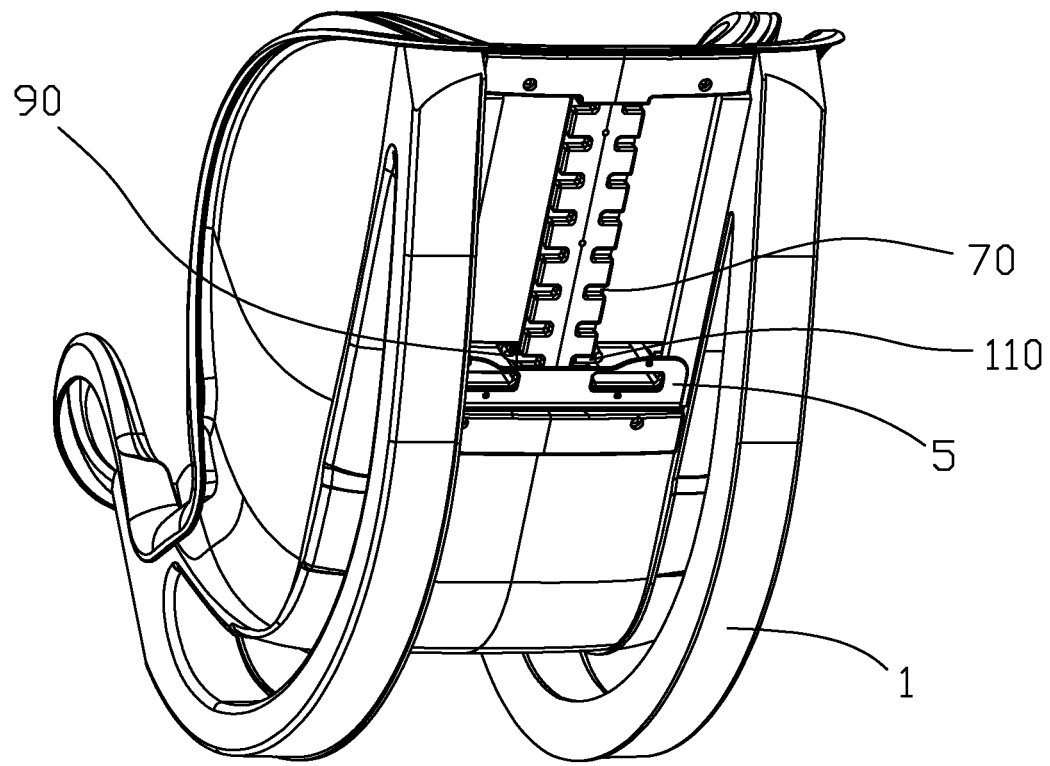
FIG. 2 is a perspective view of the assembled child safety seat with the head rest removed and showing the tab member of the first trigger rod received in the slot on one side of the adjustment plate and the tab member of the second trigger rod received in the slot of an other side of the adjustment plate in a locked state.
Figure 3:
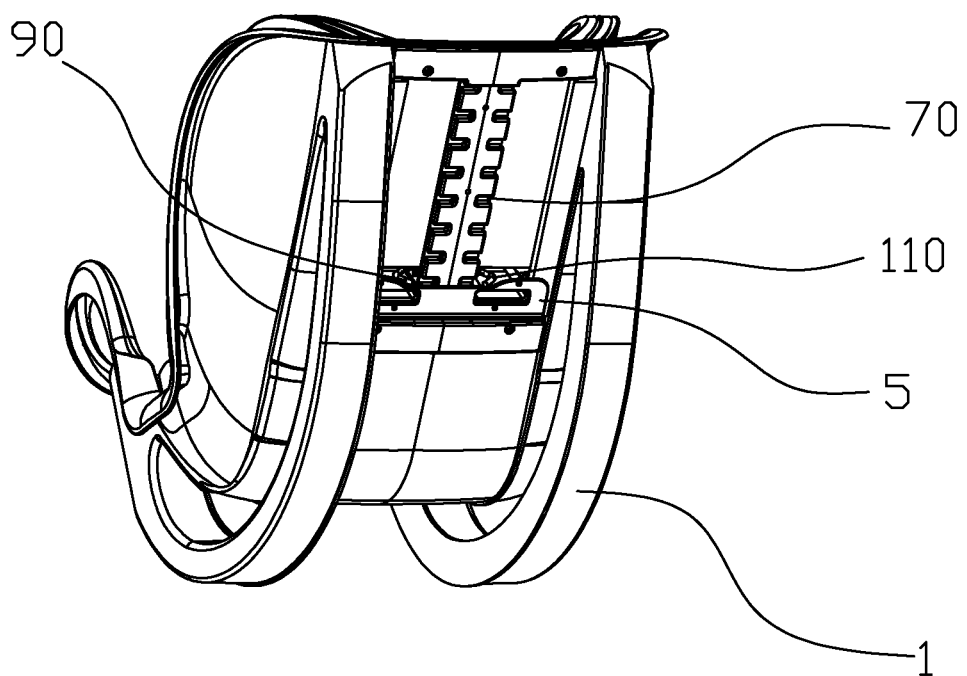
FIG. 3 is a view similar to FIG. 2 showing the tab member of the first trigger rod cleared the slot on one side of the adjustment plate and the tab member of the second trigger rod cleared the slot of an other side of the adjustment plate in an unlocked state.
Figure 4:
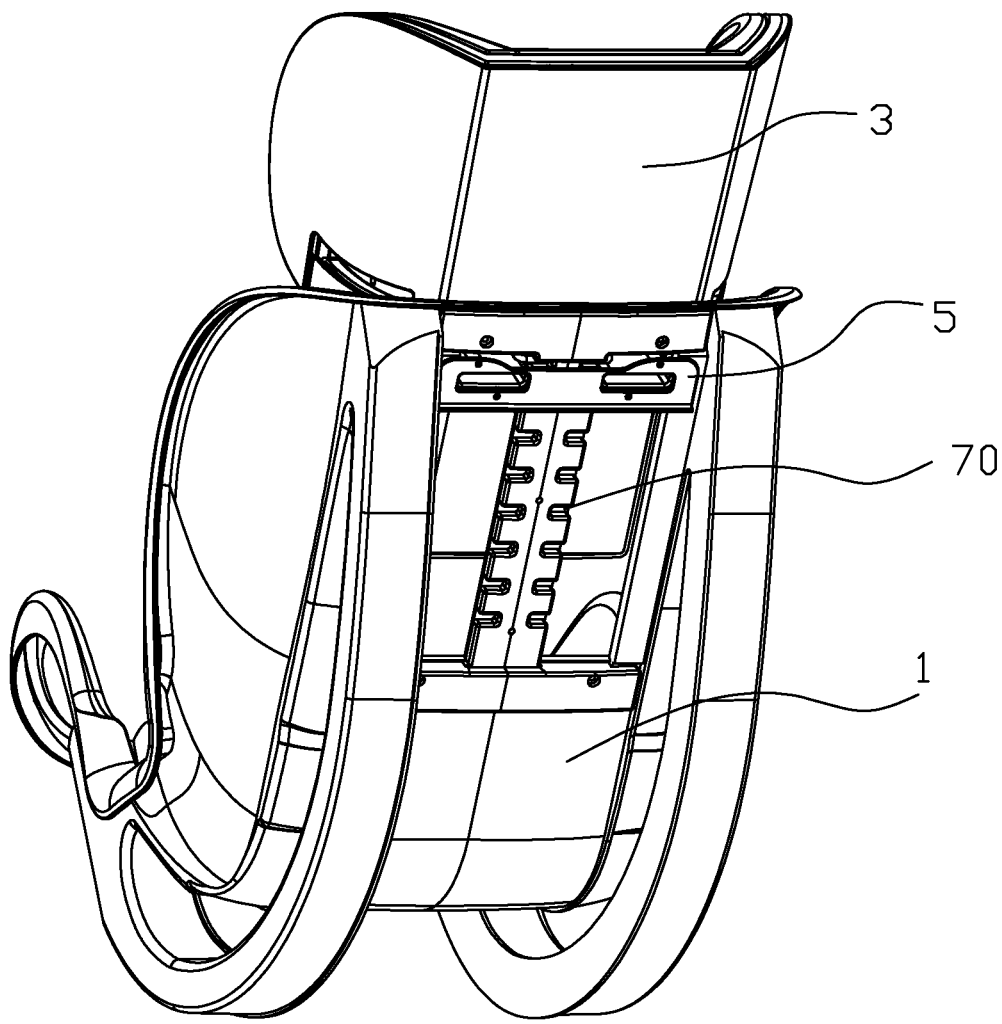
FIG. 4 is a perspective view of the assembled child safety seat where the head rest has been lifted.
Figure 5:
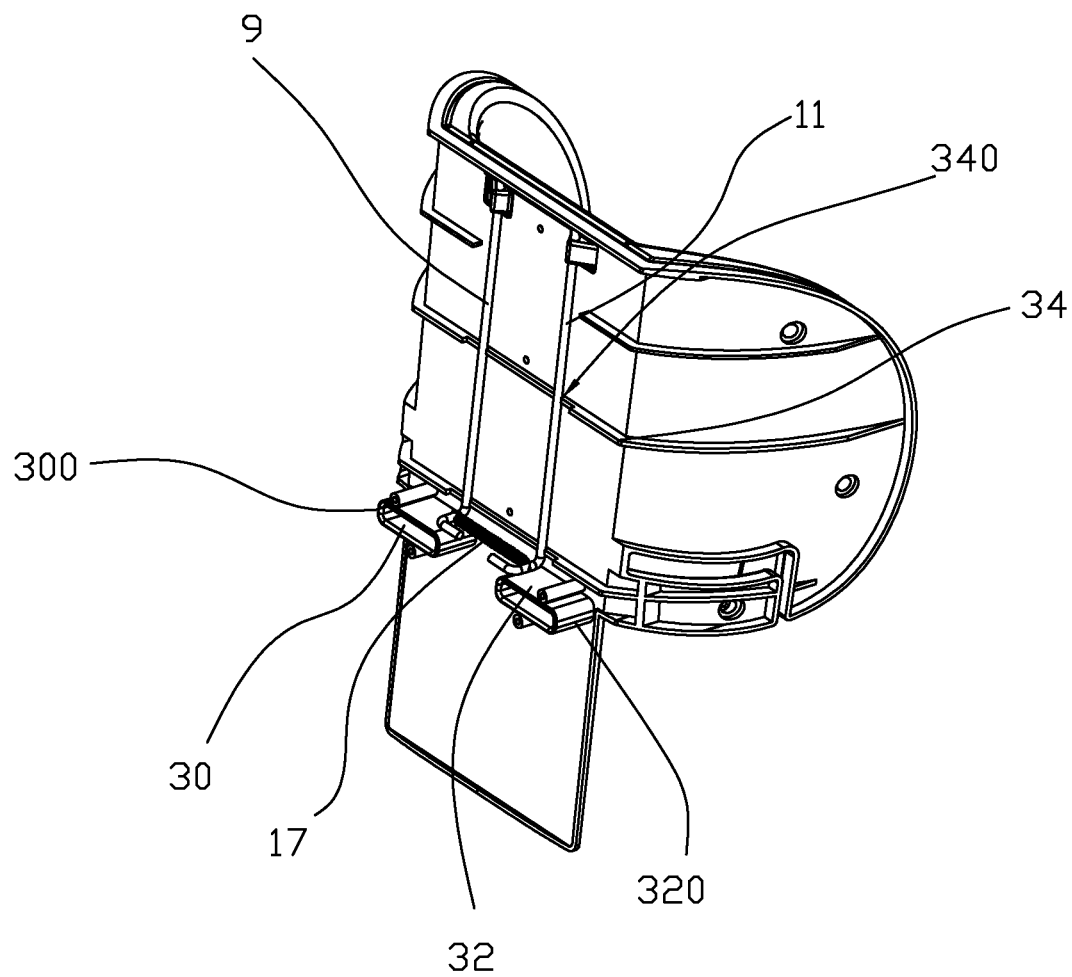
FIG. 5 is a perspective view of the head rest with the first and second trigger rods mounted thereon.
Figure 6:
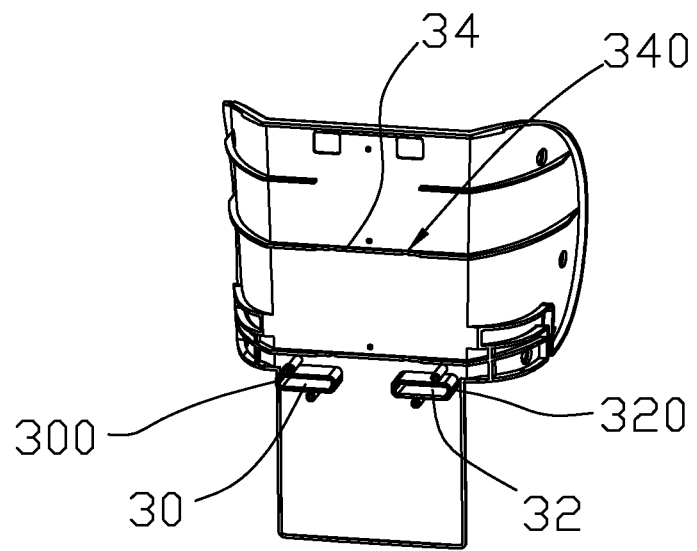
FIG. 6 is a perspective view of the head rest with the first and second trigger rods removed.

Referring to FIGS. 1 to 6, a child safety seat in accordance with the invention comprises a back rest 1 and a head rest 3. On the back of the back rest 1 there are provided a rectangular first recess 10 and a rectangular second recess 12 parallel to the first recess 10 and spaced apart. Both the first and second recesses 10, 12 are located longitudinally. On the back of the head rest 3 there are provided rearward projecting first and second projections 30, 32 which are adapted to slide on the first and second recesses 10, 12 respectively. The first projection 30 includes a shroud 300 of rectangular section having four curved corners, and the second projection 32 includes a shroud 320 of rectangular section having four curved corners. The provision of the shrouds 300, 320 facilitates the sliding movements of the first and second projections 30, 32 in the first and second recesses 10, 12 respectively.

An elongated adjustment plate 7 includes a plurality of slots 70 on both sides respectively, and two mounting plates 72 on top and bottom ends respectively. The adjustment plate 7 is mounted between the first recess 10 and the second recess 12 with the mounting plates 72 threadedly secured to the back of the back rest 1. A pressing plate 5 is disposed on a top edge of the bottom mounting plate 72 (i.e., on bottom ends of the first and second recesses 10, 12).

A cover plate 19 is provided on the back rest 1 with a first trigger rod 9 and a second trigger rod 11 disposed between them. A transverse rib 34 is provided on the back rest 1. Two longitudinal grooves 340 are provided on the back rest 1 and are perpendicular to the rib 34. The first and second trigger rods 9, 11 are disposed in the grooves 340 respectively. Above arrangement is preferred because the provision of the cover plate 19 ensures a reliable movement of the first and second trigger rods 9, 11 without undesired displacement. Alternatively, the cover plate 19 is eliminated with the first and second trigger rods 9, 11 disposed between the back rest 1 and the head rest 3.

The first trigger rod 9 includes a tab member 90 at a bottom end moveably disposed in one of the slots 70 on one side. A finger tab 13 is provided on a top end of the first trigger rod 9 and projects out of a first hole 36 on a top edge of the head rest 3. The second trigger rod 11 includes a tab member 110 at a bottom end moveably disposed in one of the slots 70 on the other side. A finger tab 15 is provided on a top end of the second trigger rod 11 and projects out of a second hole 38 on the top edge of the head rest 3. A biasing member 17 is provided between the tab member 90 and the tab member 110. Preferably, the biasing member 17 is a torsion spring.

Height adjustment of the head rest 3 is described in detail below. A user may use a finger of one hand to turn the first finger tab 13 in one direction and a finger of the other hand to turn the first finger tab 15 in an opposite direction respectively. Also, the biasing member 17 is expanded. As such, both the first and second trigger rods 9, 11 are turned to cause the tab member 90 of the first trigger rod 9 to clear the slot 70 on one side of the adjustment plate 7 and the tab member 110 of the second trigger rod 11 to clear the slot 70 of an other side of the adjustment plate 7 (see FIG. 3). As a result, the head rest 3 is unlocked to be ready to move longitudinally.

After a desired height of the head rest 3 is reached and the tab members 90, 110 are aligned with the slots 70 horizontally, the user may release the first and second finger tabs 13, 15 and the expanded biasing member 17 compresses to pivotably turn both the first and second trigger rods 9, 11 toward each other. As such, the tab member 90 of the first trigger rod 9 enters the slot 70 on one side of the adjustment plate 7 and the tab member 110 of the second trigger rod 11 enters the slot 70 of an other side of the adjustment plate 7 respectively (see FIG. 4). As a result, the head rest 3 is locked with respect to the back rest 1.

While the invention has been described in terms of preferred embodiments, those skilled in the art will recognize that the invention can be practiced with modifications within the spirit and scope of the appended claims.

What is claimed is:

1. A child safety seat comprising:
a back rest (1) including parallel first and second recesses (10, 20) longitudinally disposed on a back;
a head rest (3) including rearward projecting first and second projections (30, 32) configured to slide in the first and second recesses (10, 12) respectively, a first hole (36) formed on a top edge, and a second hole (38) formed on the top edge;
an elongated adjustment plate (7) mounted on the back of the back rest (1) and including a plurality of slots (70) on both sides respectively;
a pressing plate (5) disposed on the first and second projections (30, 32);
first and second trigger rods (9, 11) disposed between the back rest (1) and the head rest (3) wherein the first trigger rod (9) includes a tab member (90) at a bottom end moveably disposed in one of the slots (70) on one side of the adjustment plate (7), and a finger tab (13) at a top end; the second trigger rod (11) includes a tab member (110) at a bottom end moveably disposed in one of the slots (70) on an other side of the adjustment plate (7), and a finger tab (15) on a top end; and the finger tab (13) of the first trigger rod (9) projects out of the first hole (36), and the finger tab (15) of the second trigger rod (11) projects out of the second hole (38); and
a biasing member (17) disposed between the tab member (90) of the first trigger rod (9) and the tab member (110) of the second trigger rod (11) wherein the biasing member (17) acts to dispose the tab member (90) of the first trigger rod (9) in one of the slots (70) on one side of the adjustment plate (7), and dispose the tab member (110) of the second trigger rod (11) in one of the slots (70) on an other side of the adjustment plate (7).

2. The child safety seat of claim 1, further comprising a cover plate (19) disposed on the head rest (3) with the first and second trigger rods (9, 11) disposed in between the cover plate (19) and the head rest (3), a transverse rib (34) disposed on the head rest (3), and two longitudinal grooves (340) disposed on the head rest (3) and intersecting the rib (34); and wherein the first and second trigger rods (9, 11) are disposed within the grooves (340) respectively.

3. The child safety seat of claim 1, wherein the adjustment plate (7) further comprises two mounting plates (72) on top and bottom ends respectively, the mounting plates (72) being threadedly secured to the back of the back rest (1).

4. The child safety seat of claim 1, wherein the first projection (30) includes a shroud (300) of rectangular section having four curved corners, and the second projection (32) includes a shroud (320) of rectangular section having four curved corners.

* * * * *